July 26, 1960     H. J. MAYNARD     2,946,244
METHOD AND APPARATUS FOR MIST COOLING CUTTING TOOLS
Filed Dec. 24, 1958     2 Sheets-Sheet 1
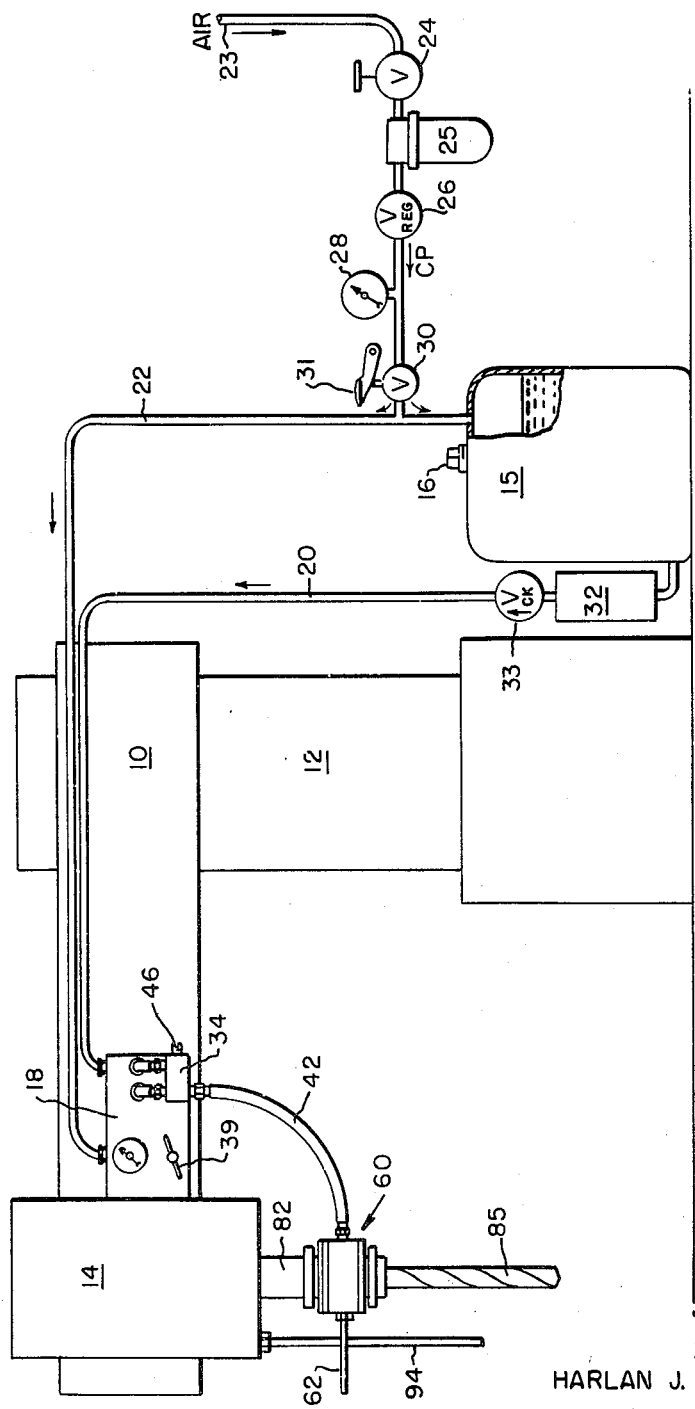
Fig. I
INVENTOR.
HARLAN J. MAYNARD
BY
KENWAY, JENNEY, WITTER & HILDRETH
ATTORNEYS

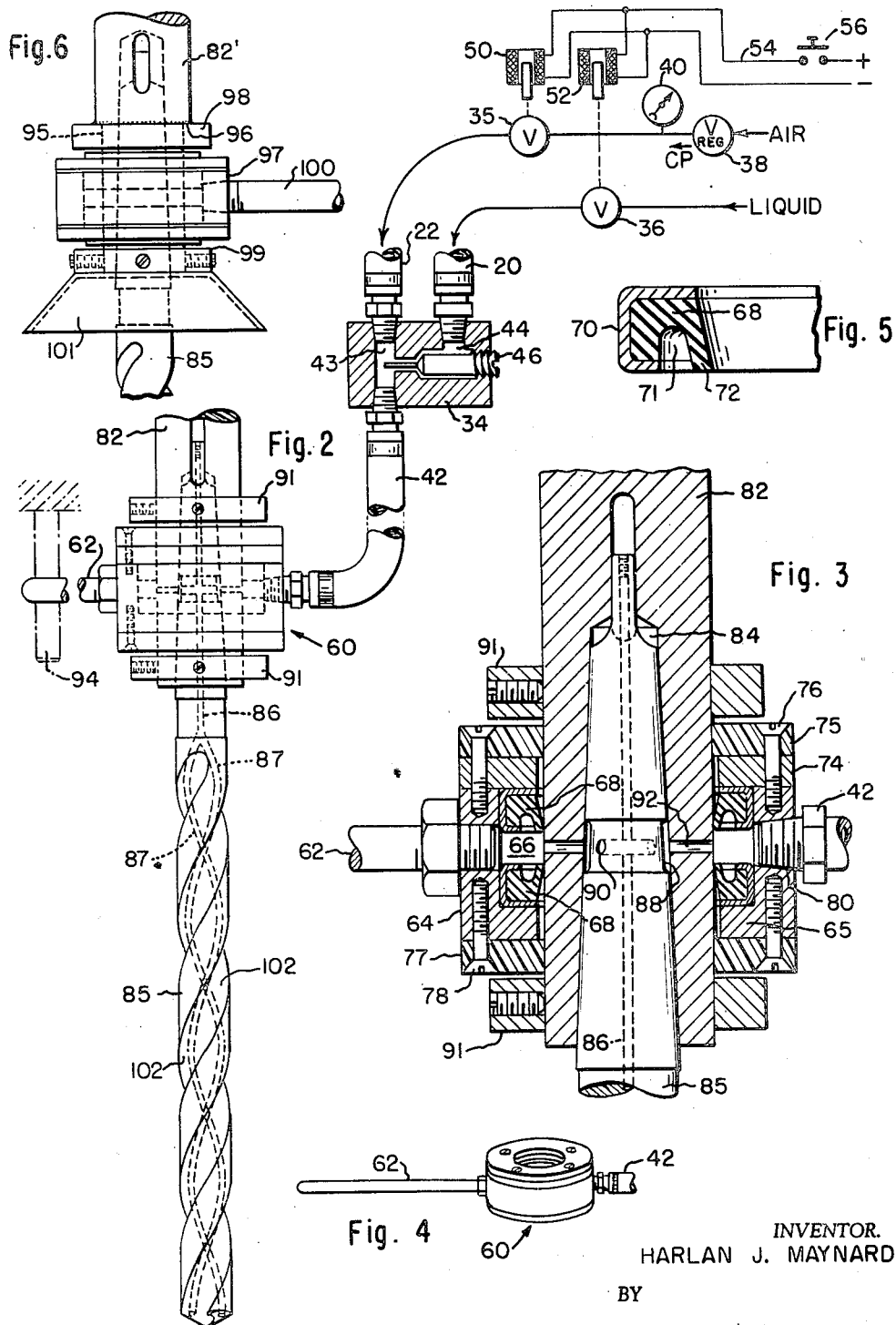

United States Patent Office 2,946,244
Patented July 26, 1960

2,946,244

METHOD AND APPARATUS FOR MIST COOLING CUTTING TOOLS

Harlan J. Maynard, 341 E. 33rd St., New York, N.Y.

Filed Dec. 24, 1958, Ser. No. 782,850

10 Claims. (Cl. 77—55)

This invention relates to a novel and improved method and apparatus for mist cooling cutting tools. I am aware that drills and other cutting tools are commonly cooled by liquids flowed onto the cutting edges and also that air cooling and spray cooling by atomized liquids have been employed with varying degrees of success. I have discovered that successful spray or mist cooling of cutting tools depends in very large degree on several important factors, including more particularly (1) the uniform and constant production of a mist coolant having relatively low constant temperature, (2) the delivery of the coolant to the cutter at such low and constant temperature, (3) delivery of the coolant to the cutter uniformly and continuously, and (4) delivery of the coolant directly to or in close proximity to the cutting area of the cutter. Factors (1) and (2) provide maximum cooling effect and together with factors (3) and (4) not only keep the cutting edges uniformly cool and efficiently facilitate continuous and uninterrupted cutting but also avoid heat shock changes that tend to crystallize the tool and lead to its disintegration. The primary object of my invention herewith resides in the development and production of improved and novel method and apparatus providing such continuous and uninterrupted mist cooling of cutting tools as to increase and maintain their cutting efficiency very substantially beyond any production heretofore possible.

The invention furthermore contemplates novel and improved apparatus for efficiently producing the mist coolant and delivering it to the cutting tools. It is also particularly applicable to the drilling of metals and a further feature of the invention relates to novel and improved means for efficiently, uniformly and continuously conducting the mist coolant from a non-rotary element to the drill spindle and from thence to and through the drill to its cutting edges. This non-rotary element employs a novel sealing ring constructed to receive the drill spindle thereinto and continuously to deliver the coolant to the spindle and drill without leakage therebetween or substantial frictional resistance to rotation of the spindle and drill. The production of novel mechanism of this nature and for the purpose described comprises a further object of the invention.

These and other features of the invention will be best understood and appreciated from the following description of a preferred embodiment thereof selected for purposes of illustration and shown in the accompanying drawings in which—

Fig. 1 is an elevation of an embodiment of my invention employed in a radial drill, Fig. 2 is an enlarged elevation of the drill spindle and drill together with my novel sealing ring and illustrating a portion of the coolant supply mechanism, Fig. 3 is an enlarged sectional view through the spindle and sealing ring and illustrating the drill in elevation within the spindle, Fig. 4 is an elevation of the sealing ring, Fig. 5 is an enlarged fragmentary view of a detail shown in Fig. 3, and Fig. 6 is a fragmentary elevation of a modified construction.

While my invention herein relates to the art of mist-cooling cutting tools operative on metals, stone, plastics, etc., and including turning, boring, grinding and the like, it is particularly applicable to the art of drilling, especially the drilling of hard metals and deep holes. In the accompanying drawings I have illustrated the invention in its application to a radial drill. The invention includes novel method and apparatus for producing a uniform and constant flow of mist coolant having relatively low and constant temperature and which coolant is adapted to be conducted to any cutting tool requiring cooling treatment for efficient operation. The mist coolant producing portion of the invention, illustrated in Figs. 1 and 2 of the drawings will first be described.

The radial drill shown in Fig. 1 includes an arm 10 vertically adjustable on a column 12 and a head 14 horizontally adjustable along the arm. A closed tank 15 is supported at the base of the column 12 for holding a supply of coolant forming liquid. A removable plug 16 permits filling of the tank, an air space being left therein as illustrated. The mist coolant is formed within a control box 18 carried on the head 14. Liquid and air are conducted to the control box from the bottom and top respectively of the tank through pipes 20 and 22, portions of the pipes being flexible hose connections permitting adjustment of the head along the arm.

A source of compressed air or other suitable gas is provided to a pipe 23 and this air or its gas equivalent is conducted through a control valve 24, an air filter 25 and a pressure regulator 26 to the air pipe 22. An air pressure gauge 28 and a quick exhaust valve 30 are disposed in the air supply pipe between the regulator 26 and the pipe 22. The valve 30 includes a manually operable lever 31 whereby the pressure can be quickly exhausted from the tank prior to removal of the plug 16 and replenishing the liquid supply.

The filter 25 and regulator 26 aid in maintaining a constant supply of filtered air and constant pressure within the tank which in turn provides a constant pressure and flow of liquid from the tank through the pipe 20. A filter 32 and a check valve 33 in the pipe 20 serve to assure a flow of clean liquid and to prevent back pressure to the tank, all as hereinafter more specifically described.

The pipes 20 and 22 connect to a needle controlled mixing valve 34 shown in Fig. 2, and the flow of air and liquid therethrough is under the control of valves 35 and 36 within the control box. A regulator 38 manually adjustable at 39 for reducing the air pressure in the pipe 22 is disposed forwardly of the valve 35, the reduced pressure being indicated on a gauge 40. The connection of the air pipe 22 to the valve body 34 is in alignment with a hose connection 42 for conducting the coolant to the cutting tool. The valve body 34 is chambered to provide a mixing space 43 between the pipes 22 and 42, and the liquid pipe 20 is connected to the body at a communicating chamber 44. The flow of liquid from the chamber 44 to the chamber 43 is under the control of a needle 46 adjustably threaded into the body. As will be apparent, the flow of air passing through the chamber 43 mixes with the liquid entering from the chamber 44 and thus forms the required mist coolant.

The purpose of the regulator 38 is to reduce the pressure of air entering the mixing valve 34 and such reduction of pressure serves two important functions, namely, (1) substantially reduces the temperature of the air through its expansion at the regulator and (2) provides a relatively higher liquid pressure within the pipe 20 whereby the liquid is discharged into the chamber 43 at the relatively higher pressure. The check valve 33 furthermore aids in maintaining a constant liquid pressure within the pipe 20. Such controls of the pressure and flow of air and liquid contribute substantially to the constant requirements embodied in the invention and a further simultaneous control of the air and liquid flow, illustrated in Fig. 2, adds substantially to the efficiency effected by my invention. The valves 35 and 36 are normally closed and they are respectively connected to the cores of two solenoids 50 and 52. The solenoids are wired into a circuit 54 having a normally open push button switch 56 therein. When the switch is closed both solenoids are simultaneously energized and simultaneously open both valves to permit the flow of air and liquid to the mixing valve 34.

Since the invention is particularly applicable to the drilling of deep holes and hard metals, I have illustrated one embodiment thereof as applied to a radial drill. It will be apparent that this application of the invention requires the conducting of the mist coolant from a fixed part of the machine to and through the rotary drill to its cutting edges. An important feature of the invention includes a novel sealing ring constructed to receive the drill spindle thereinto and continuously to deliver the coolant to the spindle and drill without leakage therebetween or substantial frictional resistance to rotation of the spindle and drill. This ring and its application to the invention as illustrated in Figs. 1–5 of the drawings will now be described.

The sealing ring comprises an annulus 60 having an arm 62 rigidly affixed thereto and extending radially outward therefrom. The arm is threaded into a centrally disposed annular body member 64 having two spaced sealing ring units seated therein. The bottom unit rests on an annular flange 65 integral with the body 64 and the upper unit is spaced therefrom to provide an inwardly open annular chamber 66 between the units. Each unit comprises an annular gasket 68 of resiliently flexible composition supported within an annular cage 70. The inner face of each gasket is annularly chambered at 71 to provide an annular sealing lip 72. The units are press-fitted into the body 64 and an annular metal plate 74 overlaps the upper unit and is held secured to the body 64 by a flat collar 75 of nylon or the like and screws 76 threaded into the body 64. A like flat collar 77 is applied to the bottom face of the body 64 by screws 78. The body 64 is provided with a threaded opening 80 for receiving the hose connection 42.

The opening through the annulus 60 is of a size to receive the drill spindle 82 and, as illustrated in Fig. 3, the collars 75 and 77 are constructed accurately to fit the spindle and support the annulus 60 coaxially thereon, the openings through the metal parts 64 and 74 being somewhat larger to preclude any contact with the spindle. The spindle is recessed at 84 to receive and support the tapered shank of a drill 85. A bore 86 extends axially through the shank portion of the drill and divides at the spiral portion thereof to provide two spiral ports or bores 87 extending therethrough to the cutting end of the drill. In Fig. 3 I have illustrated the drill shank as annularly recessed to provide an annular channel 88 therearound, it being understood however that the channel can be provided by recessing the spindle 82 if desired. A port 90 is formed diametrically through the drill to connect the channel 88 with the bore 86. The member 60 is held on the spindle by and between two locking collars 91 and is positioned to dispose the annular chamber 66 in direct communication with the annular channel 88 through one or more ports 92 formed in the spindle.

Particular attention is called to the fact that the sealing ring 60 is mounted directly on the drill spindle as illustrated in Figs. 1 and 2 and thus interferes in no respect with the full axial movement of the spindle and drill. The mist coolant hose 42 is connected to the ring 60 as illustrated and the ring is held from rotation by a rod 94 affixed to and extending downwardly from the drill head 14 in position to be engaged by the radial arm 62.

The production of an efficient and satisfactory mist coolant requires a uniform and constant pressure flow of the air and liquid elements to the mist forming station and it will be apparent that my novel combination, including the tank 15 together with the compressed air flow thereto and the liquid and air connections 20 and 22 therefrom, fully satisfies this requirement. Also the reduction of the air pressure at 38 serves by expansion to cool the air as it enters the mixing chamber 43 and provides for injecting the liquid into the mixing chamber 43 at a pressure higher than the air pressure therein. Furthermore, the simultaneous actuation of the valves 35 and 36 assures timed uniformity of the flow of both air and liquid and contributes substantially to the uniformity and constant flow of the mist coolant produced.

The low cooling temperature of the mist coolant is an important factor in the efficient functions served by the invention and for this reason I preferably provide a mixing chamber 43 of such size that a further expansion and cooling takes place as the air and liquid pass into this chamber. The mist coolant formed in the chamber 43 is thus pre-cooled by the expanding of the air and liquid as they pass into the chamber and this coolant flows directly therefrom through the hose 42 to the sealing ring 60 which serves, together with the chambers and ports illustrated and described, to conduct the coolant continuously to the cutting edges of the drill. The pressure of the coolant within the chamber 66 functions to force the sealing lips 72 in opposite directions inwardly and into sealing contact with the spindle 82, thereby containing the coolant against leakage and without causing substantial frictional resistance to spindle rotation. The moist coolant furthermore lubricates the seals and keeps them cool. The ports 92 provide continuous communication between the annular chambers 66 and 88 and the port 90 provides continuous communication from the chamber 88 to the port 86. Thus the coolant has free, uninterrupted and continuous passage from the coolant forming chamber 43 to the cutting end of the drill where the ports 87 project the coolant directly on or adjacent to the cutting edges of the drill where even further expansion of the coolant takes place and aids in cooling the drill and work. Such continuous and uniform application of the coolant maintains the cuttting edges uniformly cool, thereby maintaining efficient and maximum cutting action and eliminating heat shock changes that tend to crystallize the drill and lead to its disintegration. The further continuous flow of coolant upwardly along the drill flutes 102 aids substantially in chip removal and thereby adds to the cutting efficiency. The moist coolant wets and lubricates the surfaces of the hole and drill flutes, thereby aiding the discharging movement of the chips by the outwardly flowing air.

The work to be drilled is ordinarily spotted at several locations to be drilled and when the drill is withdrawn from a drilled hole and moved to the next spot the blasts of coolant from the end of the drill serve the further important function of blowing the surface chips free so that the spot to be drilled is fully exposed to the view of the operator. Otherwise the operator is required to clear the chips by air blast or otherwise before he can proceed.

In Fig. 6 I have illustrated a modified construction in which the spindle 82′ has a forward portion 95 of reduced diameter and providing a forwardly facing annular shoulder 96. A sealing ring 97 is mounted on the spindle portion 95 and confined thereon between a stop collar 98 abutting against the shoulder 96 and permanently affixed rigidly to the spindle and a removable collar 99. A pipe 100 threaded into the ring serves the functions of providing coolant to the ring and preventing rotation of the ring with the spindle, thus eliminating the arm 62. The collar 99 is extended to provide an outwardly-forwardly tapering conical hood 101 coaxial with and extending forwardly from the collar.

It is known that very heavy duty drilling causes extreme vibration and the permanently affixed collar 98 provides a permanently removable backstop abutment for supporting the sealing ring 97 in such operations. The hood 101 is located adjacent to the exit ends of the drill flutes 102 and serves the function of confining the coolant spray and chips as they pass rearwardly through and outwardly of the flutes, thus protecting the operator and wide spreading of the coolant and chips.

The invention substantially as herein illustrated and described has been test employed in several large plants in the drilling of steel plates under standard conditions and in competition with the best known drilling practice in the art. In all such tests my invention has proved very substantially superior in numerous factors including speed of drilling, time and extent of drilling before resharpening of the drill is required, useful life of drill, actual cost per hole drilled, etc. The markedly superior results effected by such tests indicates quite conclusively a very substantial advance in the art resulting from the various factors above described and including (1) the uniform and constant pressure formation of the mist coolant as described and illustrated in Fig. 2, and (2) the uniform conducting of the coolant continuously and uninterruptedly to the cutting portion of the tool and including the novel sealing ring 60 for use in efficiently transferring the coolant to a rotary member such as the drill spindle 82.

Having thus disclosed my invention what I claim as new and desire to secure by Letters Patent is:

1. A method of mist cooling a cutting tool which consists in providing and maintaining a source of air under predetermined and constant pressure, conducting air therefrom at reduced pressure to a mist forming station and from thence in a stream at predetermined and constant pressures to a cutting tool, and simultaneously therewith injecting a predetermined flow of liquid into said air at said station at a constant pressure greater than the air pressure in said stream, whereby a uniform flow of air-liquid mist coolant is formed and conducted to said tool.

2. The method defined in claim 1 plus the step of further reducing said pressure of air at said mist forming station and thereby further cooling the air by expansion prior to said injecting of the flow of liquid into said stream.

3. A method of mist cooling a cutting tool which consists in providing a body of liquid under predetermined air pressure at the surface of the liquid body, supplying a flow of air thereto at and maintaining said pressure, conducting air therefrom at said pressure to a controlling station, conducting a channel of liquid at said pressure from said liquid body to a mist forming station, reducing the pressure of said air at said controlling station, conducting a stream of said air at said reduced pressure to a cutting tool, and simultaneously therewith injecting into said stream at the mist forming station a predetermined flow of liquid from said channel, whereby a uniform flow of air-liquid mist coolant is formed and conducted to said tool.

4. A method of mist cooling a drill which consists in providing and maintaining a source of air under predetermined and constant pressure, conducting air therefrom at reduced pressure to a mist forming station and including a stream of said air at predetermined and constant pressure at said station, simultaneously therewith injecting a predetermined flow of liquid into said air at said station at a constant pressure greater than the air pressure in said stream, thereby combining said air and liquid into a uniform flow of air-liquid mist coolant, and conducting said flow of mist coolant to an annular channel surrounding the drill and from thence continuously through ports extending through the drill from the annular channel to the cutting end of the drill and thence outwardly along the drill flutes.

5. An apparatus for mist cooling a cutting tool comprising in combination, a closed tank adapted to hold a supply of liquid, means for supplying a flow of air to the tank at predetermined pressure and adapted to maintain said pressure within the tank, means for conducting air from the tank at said pressure to a controlling station, means for conducting a channel of liquid at said pressure from the tank to a mist forming station, means for reducing the pressure of said air at the controlling station, means for conducting a stream of said air at said reduced pressure to a cutting tool, and means for simultaneously injecting into said stream at the mist forming station a predetermined flow of liquid from said channel, whereby a uniform flow of air-liquid mist coolant is conducted to said tool.

6. In combination, a rotary cylindrical spindle open at one end to receive and support a drill, a drill mounted within and fixed to rotate with the spindle and having ports extending longitudinally therethrough to the cutting end of the drill and including an annular port surrounding the drill within the spindle, an annulus on the spindle having an annular channel therein surrounding the spindle and said annular port and in constant communication through the spindle with said annular port, said annulus including flexible sealing rings surrounding the spindle at opposite sides of the channel and disposed to be forced apart and held in sealing contact with the cylindrical wall of the spindle by fluid pressure within the channel, and means for conducting fluid under pressure to the annular channel, said fluid pressure in the channel being adapted to hold said rings in fluid sealing contact with the spindle and permit rotation of the spindle within the annulus.

7. The combination defined in claim 6 plus means comprising a stop collar rigidly affixed to the spindle at the rear face of the annulus and a removable stop collar rigidly affixed to the spindle at the forward face of the annulus for confining the annulus therebetween on the spindle, and an outwardly-forwardly tapering conical hood coaxial with and affixed to and extending forwardly from the removable collar.

8. The combination defined in claim 7 in which the first named collar is a permanent and rigid part of the spindle and in abutting relation with a forwardly facing annular shoulder on the spindle.

9. A method of mist cooling a cutting tool, which consists in conducting a stream of air under predetermined and constant pressure to a closed and relatively larger chamber wherein said air expands, simultaneously therewith injecting into the expanded air a predetermined flow of liquid at a constant pressure greater than the air pressure in the chamber whereby a relatively cool air-liquid mist coolant is formed, and simultaneously therewith conducting said air-liquid mist coolant in a stream at predetermined and constant pressure to a cutting tool.

10. The method defined in claim 9 in which said liquid is injected into said chamber and the expanded air therein unites with the air in the chamber to form said air-liquid mist coolant.

References Cited in the file of this patent
UNITED STATES PATENTS

| | | |
|---|---|---|
| 932,060 | Richards | Aug. 24, 1909 |
| 962,077 | Condict | June 21, 1910 |
| 2,080,206 | Holmboe | May 11, 1937 |
| 2,549,174 | Coward | Apr. 17, 1951 |

FOREIGN PATENTS

| | | |
|---|---|---|
| 75/26 | Australia | May 3, 1926 |
| 686,778 | Great Britain | Jan. 28, 1953 |
| 957,897 | Germany | Feb. 7, 1957 |

OTHER REFERENCES

"Mist Cooling," "American Machinist" magazine; pp. 137–142; September 14, 1953.